(12) United States Patent
    Yoshizawa

(10) Patent No.: US 10,404,877 B2
(45) Date of Patent: Sep. 3, 2019

(54) IMAGE INSPECTION APPARATUS, IMAGE INSPECTION SYSTEM, AND METHOD FOR DETERMINING IMAGE POSITION

(71) Applicant: Konica Minolta, Inc., Chiyoda-ku, Tokyo (JP)

(72) Inventor: Masanori Yoshizawa, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/855,784

(22) Filed: Dec. 27, 2017

(65) Prior Publication Data

US 2018/0198937 A1    Jul. 12, 2018

(30) Foreign Application Priority Data

Jan. 11, 2017   (JP) ................. 2017-002308

(51) Int. Cl.

| | | |
|---|---|---|
| H04N 1/60 | (2006.01) |
| H04N 1/00 | (2006.01) |
| G06K 9/00 | (2006.01) |
| G06K 9/46 | (2006.01) |
| H04N 1/56 | (2006.01) |
| G06K 9/38 | (2006.01) |
| G06K 9/62 | (2006.01) |

(Continued)

(52) U.S. Cl.
    CPC ..... *H04N 1/00702* (2013.01); *G06K 9/00442* (2013.01); *G06K 9/38* (2013.01); *G06K 9/4604* (2013.01); *G06K 9/4671* (2013.01); *G06K 9/6211* (2013.01); *H04N 1/4097* (2013.01); *H04N 1/56* (2013.01); *G06K 2009/3225* (2013.01)

(58) Field of Classification Search
    None
    See application file for complete search history.

(56) References Cited

U.S. PATENT DOCUMENTS 8,585,174 B2 * 11/2013 Saita .................... B41J 3/60
                                              347/19
9,524,545 B2 * 12/2016 Fukase ................. G06T 7/001
(Continued)

FOREIGN PATENT DOCUMENTS

| JP | 2004-195878 | 7/2004 |
| JP | 2013-186562 | 9/2013 |

*Primary Examiner* — Dung D Tran
(74) *Attorney, Agent, or Firm* — Squire Patton Boggs (US) LLP

(57) ABSTRACT

An image inspection apparatus includes: an image forming apparatus that is capable of forming an image of a plurality of colors and includes: an inspector that compares a scanned image obtained by scanning a surface of a sheet on which a job image and a marker image are formed with a reference image, and detects a defect in the scanned image, wherein a color of the marker image is a color having the lowest visibility, and the inspector extracts feature points of the job image and of the marker image from a scanned image of a color corresponding to a complementary color of the color having the lowest visibility included in the scanned image, and determines a position of the scanned image corresponding to the reference image based on the extracted feature points and feature points of the job image and of the marker image in the reference image.

10 Claims, 7 Drawing Sheets

(51) Int. Cl.
*H04N 1/409* (2006.01)
*G06K 9/32* (2006.01)

(56) References Cited

U.S. PATENT DOCUMENTS

| | | | |
|---|---|---|---|
| 2012/0121139 A1* | 5/2012 | Kojima | B41F 33/0036 |
| | | | 382/112 |
| 2013/0051665 A1* | 2/2013 | Shinozaki | G06T 5/00 |
| | | | 382/167 |
| 2013/0235396 A1* | 9/2013 | Hyoki | H04N 1/38 |
| | | | 358/1.9 |
| 2014/0313538 A1* | 10/2014 | Kitai | H04N 1/4092 |
| | | | 358/1.14 |

* cited by examiner

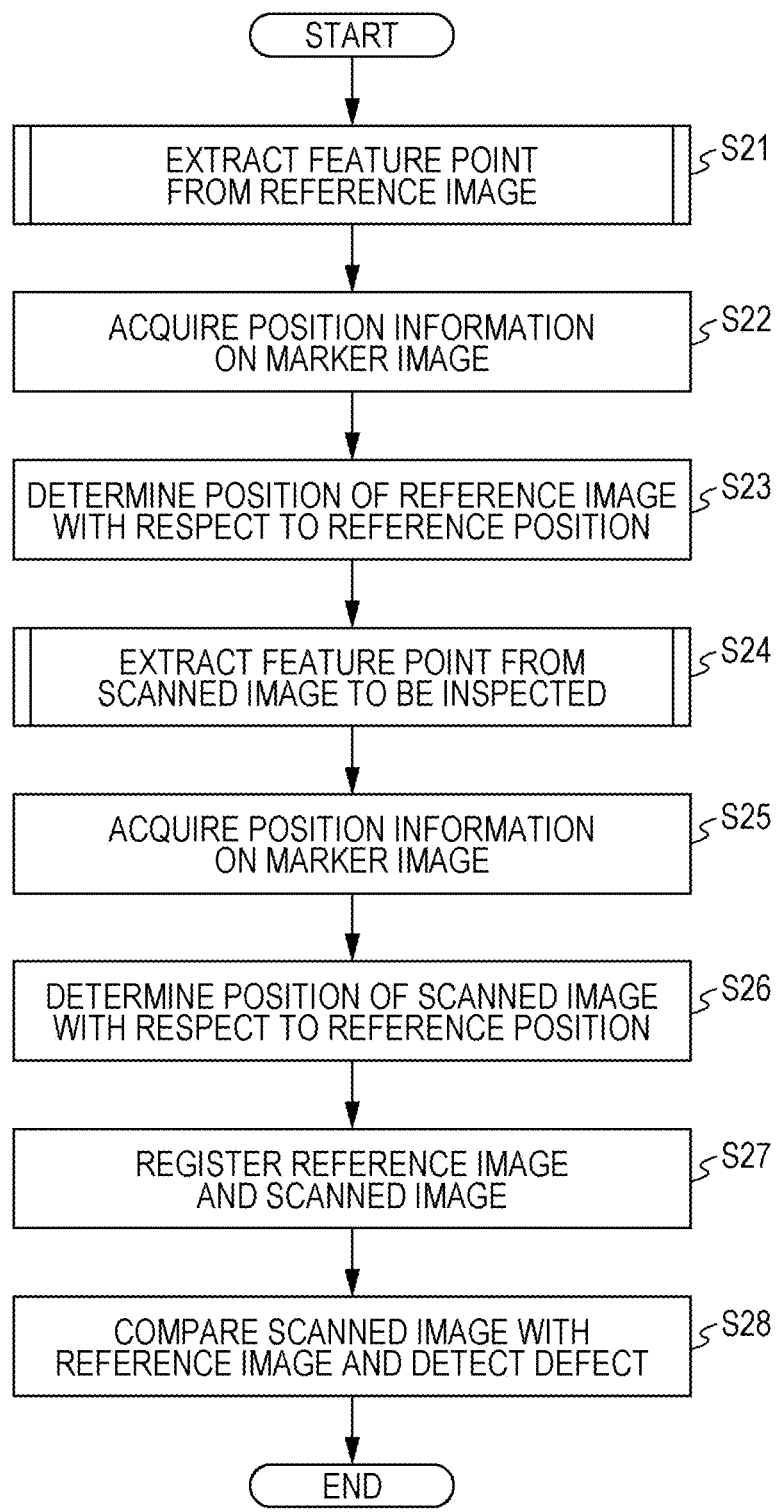

IMAGE INSPECTION APPARATUS, IMAGE INSPECTION SYSTEM, AND METHOD FOR DETERMINING IMAGE POSITION

The entire disclosure of Japanese patent Application No. 2017-002308, filed on Jan. 11, 2017, is incorporated herein by reference in its entirety.

BACKGROUND

Technological Field

The present invention relates to an image inspection apparatus, an image inspection system, and a method for determining an image position.

Description of the Related Art

Inspection for detecting defects such as dust, toner scattering, and missing or error of characters has been performed after an image is formed on a sheet by an image forming apparatus such as a printer or a copying machine by scanning the surface of the sheet and comparing the scanned image with an inspected reference image.

If the scanned image and the reference image are misregistered, a large difference is generated, and a normal image portion can be erroneously detected as a defect. Thus, when a scanned image is compared with a reference image, the images are registered as pre-processing (see, for example, JP 2013-186562 A).

In order to perform registration, generally, a marker for registration such as a cross or a hook called a register mark is formed. However, when a marker is formed together with a job image, the appearance of a printed matter is deteriorated. Although a marker can be formed on a sheet portion to be removed by cutting after image formation, conditions for forming a marker are limited.

There has been proposed a method in which registration is performed without deteriorating the appearance by forming a marker with a color that is unnoticeable such as yellow (Y) (see, for example, JP 2004-195878 A). However, since the marker is detected from a scanned image by pattern matching and registration is performed, if a job image includes a pattern similar to the marker, an error can occur in position detection of the marker. In addition, when a multicolor image is formed, misregistration of each color image called color resist can occur. Furthermore, when misregistration occurs only in the Y-color image, it is not stable to perform the registration based on the Y-color maker.

SUMMARY

An object of the present invention is to accurately determine a position of a scanned image without deteriorating a job image.

To achieve the abovementioned object, according to an aspect of the present invention, an image inspection apparatus reflecting one aspect of the present invention comprises:

an image forming apparatus capable of forming an image of a plurality of colors, wherein the image forming apparatus comprises:

an inspector that compares a scanned image of a plurality of colors obtained by scanning a surface of a sheet on which a job image and a marker image are formed with a reference image, and detects a defect in the scanned image, a color of the marker image on the sheet is a color having the lowest visibility among the plurality of colors, and the inspector extracts feature points of the job image and of the marker image from a scanned image of a color corresponding to at least a complementary color of the color having the lowest visibility among the plurality of colors included in the scanned image, and determines a position of the scanned image corresponding to the reference image based on the extracted feature points and feature points of the job image and of the marker image in the reference image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a flowchart showing another processing procedure when the image inspection system perform inspection.

DETAILED DESCRIPTION OF EMBODIMENTS

Hereinafter, one or more embodiments of an image inspection apparatus, an image inspection system, and a method for determining an image position according to the present invention will be described with reference to the drawings. However, the scope of the invention is not limited to the disclosed embodiments.

Figure 1:
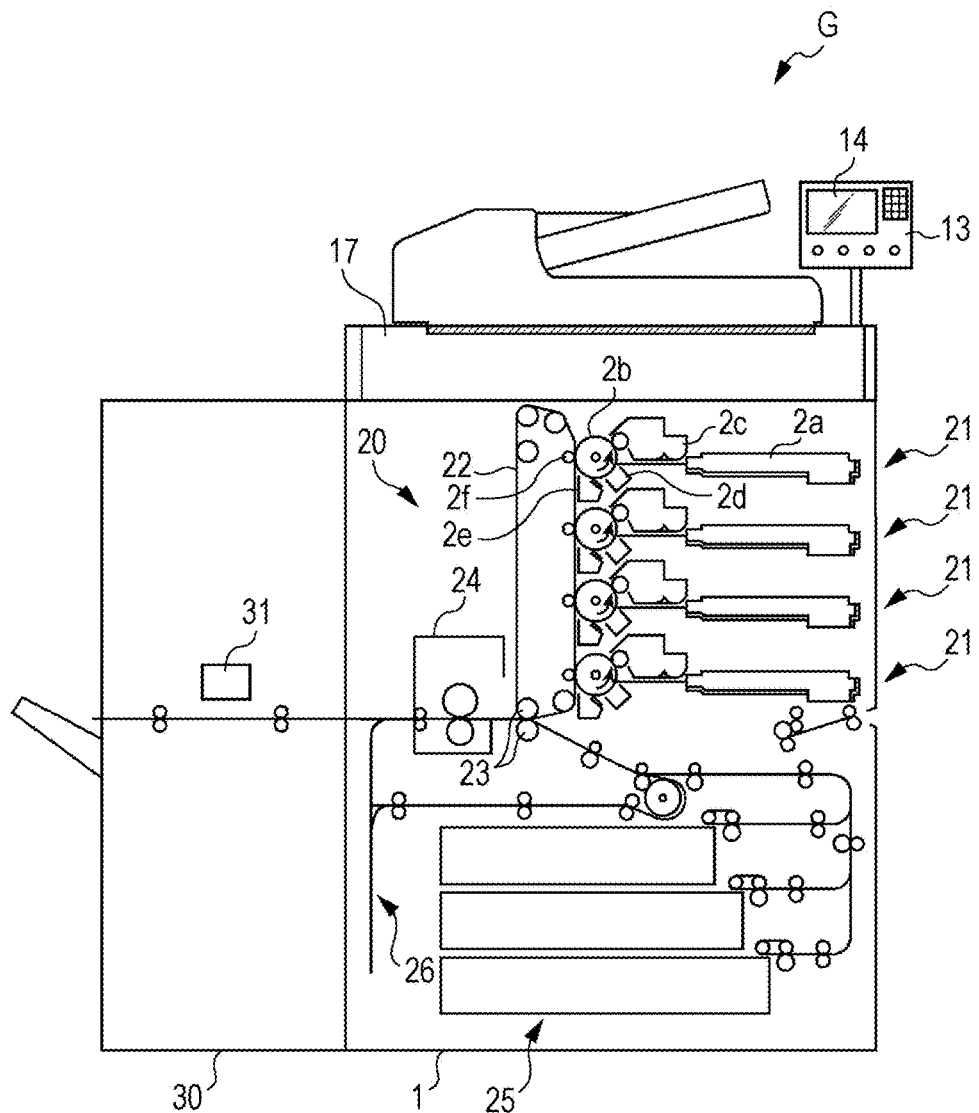
FIG. 1 is a front view showing a main configuration of an image inspection system according to an embodiment of the present invention.

FIG. 1 shows a main configuration of an image inspection system G according to an embodiment of the present invention.

As shown in FIG. 1, the image inspection system G includes an image forming apparatus 1 and an image inspection apparatus 30. The image forming apparatus 1 can form an image of multiple colors on a sheet. The image inspection apparatus 30 detects a defect in a scanned image obtained by scanning the surface of the sheet.

Figure 2:
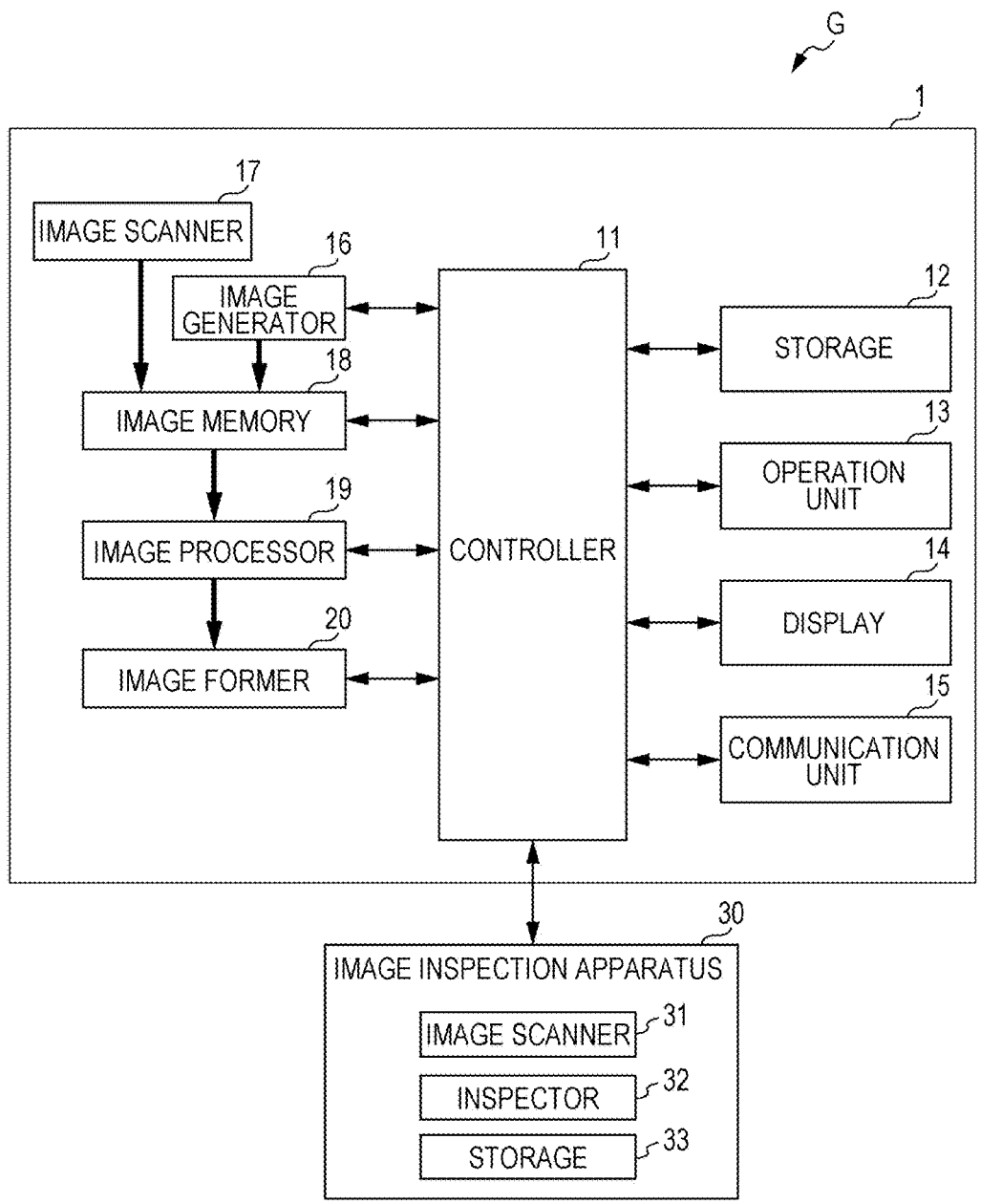
FIG. 2 is a block diagram showing a configuration of the image inspection system for each function.

FIG. 2 shows the configuration of the image inspection system G for each function.

As shown FIG. 2, the image forming apparatus 1 includes a controller 11, a storage 12, an operation unit 13, a display 14, a communication unit 15, an image generator 16, an image scanner 17, an image memory 18, an image processor 19, and an image former 20.

The controller 11 includes a central processing unit (CPU), and a random access memory (RAM), and controls the units by reading and executing various programs from the storage 12.

For example, the controller 11 causes the image processor 19 to process an original image generated by the image generator 16 or the image scanner 17 and held in the image memory 18, and causes the image former 20 to form an image on a sheet based on the processed original image. The controller 11 can cause the image inspection apparatus 30 to scan the surface of the sheet on which the image is formed and to perform inspection for detecting a defect.

The storage 12 stores programs capable of being read by the controller 11, files used for executing the programs, and the like. As the storage 12, a large capacity memory such as a hard disk can be used.

The operation unit 13 and the display 14 are user interfaces provided on the upper part of the image forming apparatus 1 as shown in FIG. 1.

The operation unit 13 generates an operation signal according to a user's operation and outputs the operation signal to the controller 11. As the operation unit 13, a touch panel with which a keypad and the display 14 are integrated, or the like can be used.

The display 14 displays an operation screen or the like according to an instruction of the controller 11. As the display 14, a liquid crystal display (LCD), an organic electro luminescence display (OELD), or the like can be used.

The communication unit 15 communicates with external devices on the network such as a user terminal, a server, other image forming apparatuses, and the like.

The communication unit 15 receives, from a user terminal via a network, data in which instruction content for forming an image is described in the page description language (PDL) (hereinafter, referred to as PDL data).

The image generator 16 rasterizes the PDL data received by the communication unit 15 to generate an original image in a bitmap format. This original image is formed of four colors of cyan (C), magenta (M), yellow (Y), and black (K), and each pixel has the pixel values of the four colors. A pixel value is a data value representing the density of an image, and for example, an 8-bit data value represents the densities of gradations of 0 to 255.

The image scanner 17 includes an automatic document feeder, and a scanner, and scans the surface of a document placed on the document table to generate an original image in a bit map format. This original image if formed of three colors of red (R), green (G), and blue (B), and each pixel has the pixel values of the three colors. The original image is to be converted into an original image having the pixel values of the four colors of C, M, Y, and K by a color converter (not shown), the controller 11, or the like.

The image memory 18 is a buffer memory that temporarily holds the original image generated by the image generator 16 or the image scanner 17. As the image memory 18, a dynamic RAM (DRAM) or the like can be used.

The image processor 19 reads the original image from the image memory 18, performs layout processing and various types of image processing. The layout processing includes rotation, enlargement, and reduction of an image, addition of a page number, and page aggregation. The image processing includes density correction processing, and half tone processing in which pseudo half tones are reproduced.

The image former 20 forms an image formed of the four colors of C, M, Y, and K on a sheet according to the pixel values of the four colors of each pixel of the original image processed by the image processor 19.

As shown in FIG. 1, the image former 20 includes four writing units 21, an intermediate transfer belt 22, secondary transfer rollers 23, a fixing device 24, and a paper feeding tray 25.

The four writing units 21 are arranged in series (tandem) along the belt surface of the intermediate transfer belt 22 to form an image of each color of C, M, Y, and K. Each writing unit 21 has the same configuration except for the color of the image to be formed, and includes an optical scanning device 2a, a photosensitive member 2b, a developer 2c, a charger 2d, a cleaner 2e, and a primary transfer roller 2f as shown in FIG. 1.

At the time of image formation, in each writing unit 21, the photosensitive member 2b is charged by the charger 2d and then scanned with the luminous flux emitted from the optical scanning device 2a based on the original image to form an electrostatic latent image. The developer 2c supplies color material and performs development, and an image is formed on the photosensitive member 2b.

The images formed on the photosensitive members 2b of the four writing units 21 are sequentially transferred (primary transfer) so as to be superimposed onto the intermediate transfer belt 22 by the respective primary transfer rollers 2f. Thereby, an image formed of each color is formed on the intermediate transfer belt 22. After the primary transfer, the cleaner 2e removes the coloring material remaining on the photosensitive member 2b.

In the image former 20, after a sheet is fed from the paper feeding tray 25 and the image is transferred (secondary transfer) from the intermediate transfer belt 22 onto the sheet by the secondary transfer rollers 23, the fixing device 24 performs fixing processing by heating and pressurizing the sheet.

In order to form images on both sides of the sheet, the sheet is conveyed to a conveying path 26 to be reversed and then is again conveyed to the secondary transfer rollers 23.

As shown in FIG. 2, the image inspection apparatus 30 includes an image scanner 31, an inspector 32, and a storage 33.

As shown in FIG. 1, the image scanner 31 is arranged on a sheet conveying path, scans the surface of the sheet on which the image is formed by the image former 20, and generates a scanned image in a bit map format. This scanned image is formed of three colors of R, G, and B, and each pixel has pixel values of the three colors of R, G, and B.

As the image scanner 31, a line sensor, an area sensor, a digital camera or the like in which an imaging element such as a Charge Coupled Device (CCD) is arranged can be used.

The inspector 32 analyzes the scanned image generated by the image scanner 31, and detects a defect such as dust, toner scattering, a character or figure image error, and missing in the scanned image. The inspection performed by the inspector 32 can be implemented by software processing in which a processor, such as a CPU, or a graphics processing unit (GPU), loads and executes an inspection program.

For example, the inspector 32 can compare the scanned image to be inspected with an inspected reference image after registration, and detect the image area where the difference exceeds an allowable range as a defect.

The storage 33 stores programs executed by the inspector 32, files necessary for executing the programs, and the like. As the storage 33, a hard disk or the like can be used.

The storage 33 stores a reference image to be used for comparison with a scanned image to be inspected in association with the feature point extracted from the reference image, the feature quantity thereof, and the like.

Figure 3:
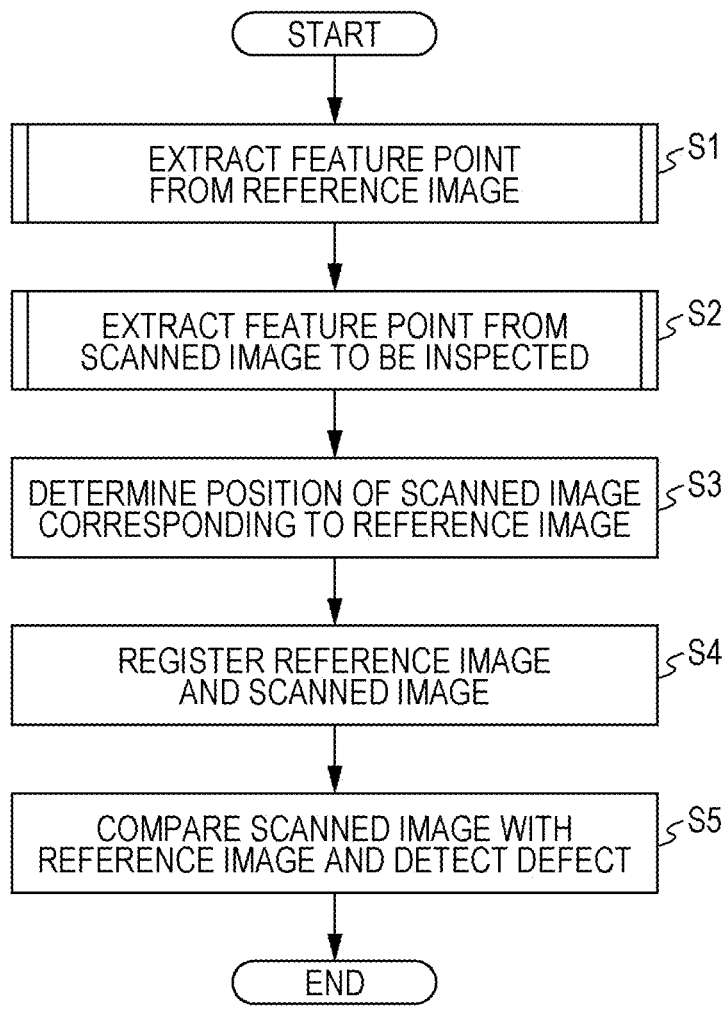
FIG. 3 is a flowchart showing a processing procedure when the image inspection system perform inspection.

FIG. 3 shows a processing procedure when the image inspection system G performs image inspection.

In the image inspection system G, as shown in FIG. 3, a feature point is extracted from a reference image determined by a user as a non-defective image by inspection (step S1).

Figure 4:
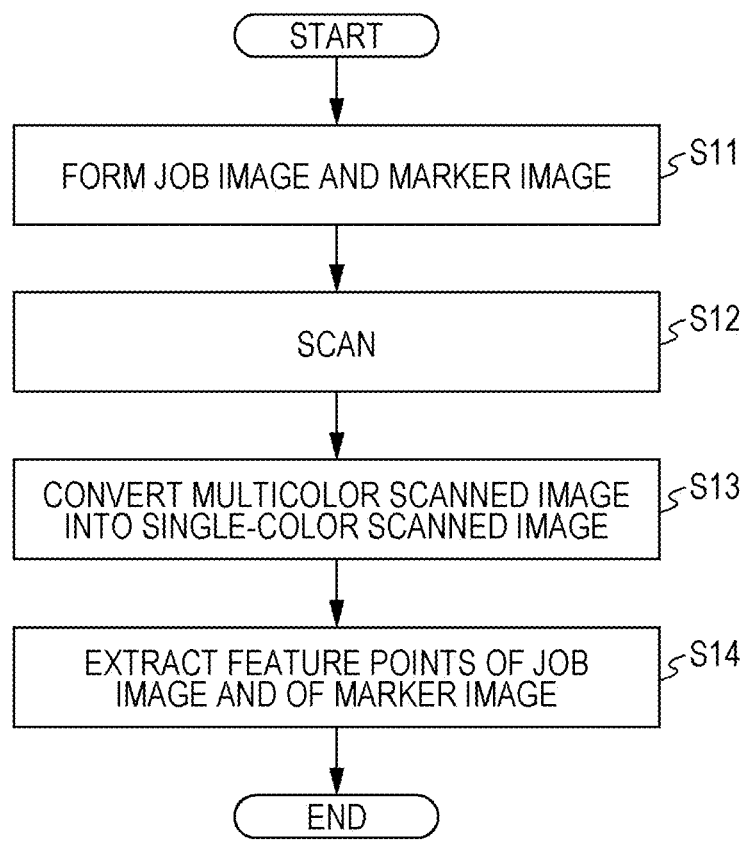
FIG. 4 is a flowchart showing a processing procedure for extracting a feature point.

FIG. 4 shows a processing procedure for extracting a feature point.

When a feature point is extracted, as shown in FIG. 4, a job image instructed to be printed by the user and a marker image for position determination are formed on the same sheet in the image forming apparatus 1 (step S11). First, the image generator 16 adds a marker image formed of the color Y, which is the lowest visibility among the colors of C, M, Y, and K, to a job image formed of the colors of C, M, Y, and K to generate a one-page original image. Based on the original image, the image former 20 forms the job image formed of the colors of C, M, Y, and K and the marker image formed of the color Y on a sheet.

It is preferable that the marker images for position determination are arranged at the four corners or the entire surface of a sheet, because the accuracy of the position determination of the scanned image scanned by the image scanner 31 is increased.

In addition, it is preferable that the marker image has a shape including a feature such as a corner or a circle, for example, has a dot shape or a line shape, because the feature point is easily obtained.

It is preferable that the size or the pixel value (density) of the marker image is set to be small so as to be hardly perceived visually. Also, from the viewpoint of preventing disappearance, the marker image may be excluded from screening.

In addition, it is preferable that the size of the marker image is set to a size that can be resolved in the scanned image obtained by the image scanner 31. In view of the above, when, for example, the resolution at the time of image formation is 600 dpi the resolution of the scanned image is 200 dpi, the diameter of the dot or the width of the line used as the marker image is set to 0.127 mm or more corresponding to one-pixel size of 200 dpi.

Figure 5A:
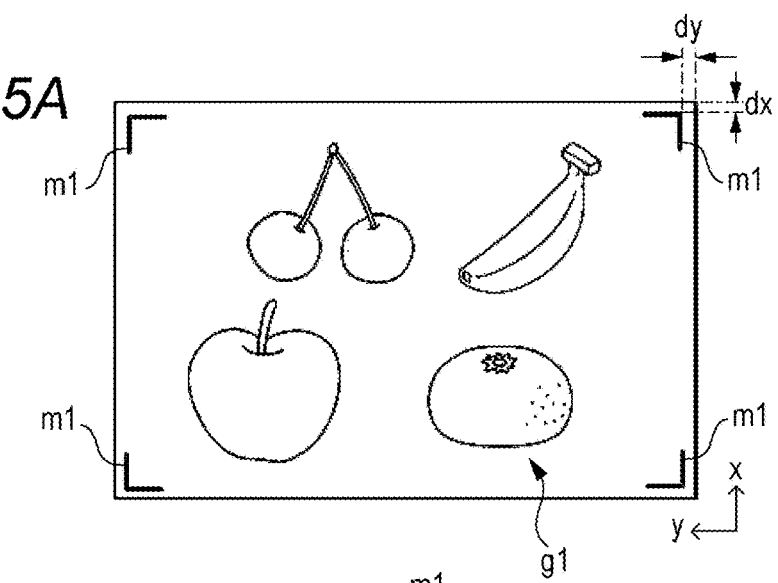
FIG. 5A is a diagram showing an example of a job image and a marker image.

FIG. 5A shows an example of line-shaped marker images m1 arranged at the four corners of a sheet. Each marker image m1 is formed at a position separated by certain distances dx and dy from the edge of the sheet in the width direction x and the conveyance direction y respectively. The width direction x of the sheet is perpendicular to the conveyance direction y.

Figure 5B:
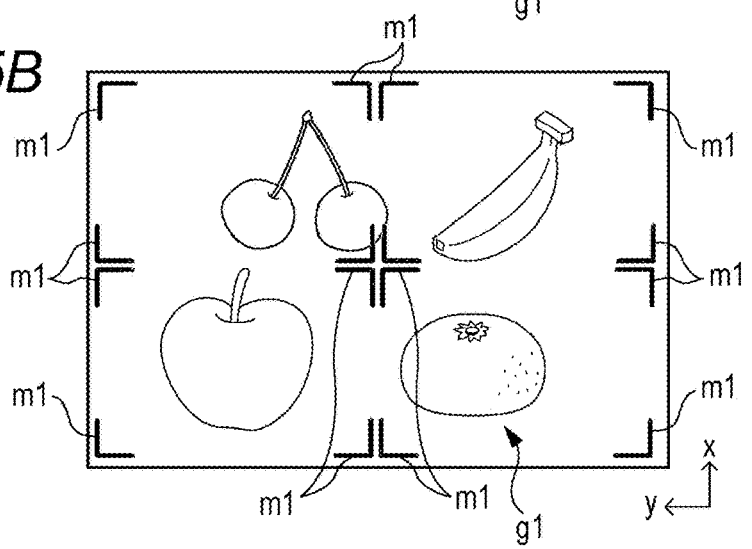
FIG. 5B is a diagram showing an example of a job image and a marker image.

FIG. 5B shows an example in which the same marker images m1 as those in FIG. 5A are arranged not only at the four corners of the sheet but also at the center positions in the width direction x of the sheet and the conveyance direction y.

Figure 5C:
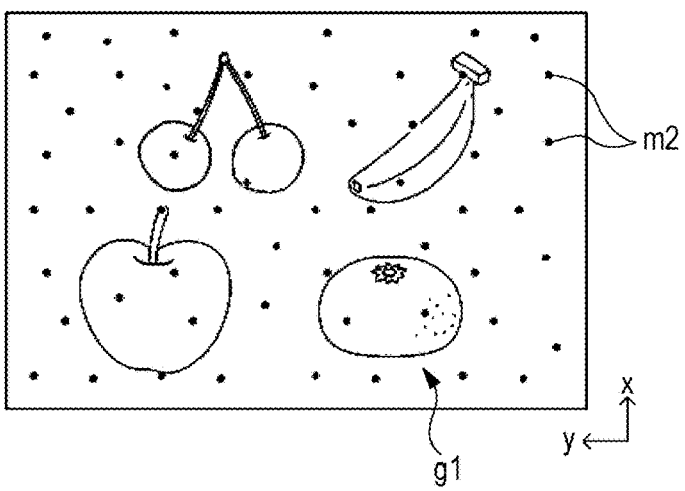
FIG. 5C is a diagram showing an example of a job image and a marker image.

FIG. 5C shows an example of dot-shaped marker images m2 arranged on the entire surface of a sheet. In the case of the dot shape, it is preferable that the marker images m2 are arranged at an interval at which at least one dot is positioned within an attention area used to extract a feature point because the feature point is easily extracted.

Since all the marker images m1 and m2 in FIGS. 5A to 5C have the low-visibility color Y, a job image g1 is not deteriorated.

In the image inspection apparatus 30, the image scanner 31 scans the sheet surface to generate a scanned image of three colors of R, G, and B (step S12).

Here, when the user inspects the job image on the sheet and determines the job image as a defective image, the above formation of the job image and marker image is repeated until the job image is determined as a non-defective image. When the job image is determined as a non-defective image, the scanned image is registered as a reference image.

When the reference image is registered, the inspector 32 converts the three-color scanned image the into a single-color scanned image including at least the color corresponding to the complementary color of the color having the lowest visibility used for forming the marker image (step S13). As described above, when the color having the lowest visibility is yellow (Y), the complementary color of the color having the lowest visibility is blue (B).

The inspector 32 can convert the three-color scanned image into a single-color (B) scanned image by extracting the B-color scanned image from the scanned images formed of the multiple colors of R, G, and B. The inspector 32 can further convert the three-color scanned image into a single-color scanned image by replacing the pixel values of the multiple colors of R, G, and B included in each pixel of the scanned image with the smallest pixel value of a single color among the pixel values.

In order to make the marker image unnoticeable, by setting the pixel value of the color Y of the marker image to be smaller than that of the job image, the complementary color B is to be the smallest pixel value among the pixel values of the colors of R, G, and B. As a result, the smallest pixel value selected from the pixel values of the colors of R, G, and B is to be the pixel value of the color B, and most pixels have the pixel value of the color B. Thus, it is possible to obtain a single-color scanned image including at least the color component B.

The inspector 32 can further convert the three-color scanned image into a single-color scanned image by weighting and averaging the pixel values of the colors of R, G, and B included in each pixel of the scanned image so that the weighting coefficient of the color B corresponding to the complementary color of the color having the lowest visibility is to be the maximum. Thus, it is possible to obtain a scanned image including at least the color component of B.

The following expression (1) shows a weighted average.

$$Cout = k1 \times Rin + k2 \times Gin + k3 \times Bin \quad (1)$$

In the above expression (1), Cout represents the pixel value of the single-color scanned image after the weighted average, and Rin, Gin, and Bin respectively represent the pixel values of the colors of R, G, and B before the weighted average. Furthermore, k1, k2, and k3 are weighting coefficients of the colors of R, G, and B respectively and satisfy $k1+k2+k3=1.0$, $0 \leq k1 < k3$, and $0 \leq k2 < k3$.

The inspector 32 extracts feature points of both the job image and the marker image from the converted single-color scanned image (step S14). The inspector 32 calculates the feature quantities of the extracted feature points and stores the scanned image as a reference image in the storage 33 together with the feature points and the feature quantities. The method for extracting a feature point is not particularly limited, and may be, for example, the SIFT, the Speed Up Robust Features (SURF), the Local Binary Pattern (LBP), the Blob Detection for extracting a corner, circle, edge, or the like as a feature point.

Next, as shown in FIG. 3, a feature point is extracted from the scanned image to be inspected in the image inspection system G (step S2). The procedure for extracting a feature point is the same as the procedure for extracting a feature point from the reference image described above, and feature points of both the marker image and the job image are extracted from the scanned image to be inspected. Although the reference image is inspected by the user, the scanned image does not need to be inspected by the user.

When the feature points are extracted from the scanned image to be inspected, the inspector 32 reads the reference image, the feature points and the feature quantities from the storage 33. Based on the feature points of the job image and the marker image extracted from the scanned image to be inspected and the feature points of the job image and the marker image extracted from the reference image, the inspector 32 determines the position of the scanned image corresponding to the reference image (step S3).

The position of the scanned image can be determined by detecting the feature point of the reference image corresponding to that of the scanned image. For example, the corresponding feature point can be detected by a pattern matching method in which the feature point having the same feature quantity is searched for in the scanned image starting from the same position as the feature point extracted from the reference image. As long as detection is performed using feature points, other methods may be used.

The inspector 32 registers the reference image and the scanned image so that the determined position of the scanned image matches with the corresponding position of the reference image (step S4). More specifically, the inspector 32 can perform the registration by performing the affine transformation, the projective transformation, or the like so that the position of the feature point of the reference image matches with the position of the corresponding feature point of the scanned image.

The inspector 32 compares the registered reference image with the registered scanned image, and detects an image area having the pixel value difference larger than a threshold value as a defect (step S5). Since the registration is performed in advance, false detection of defects can be reduced.

Figure 6A:
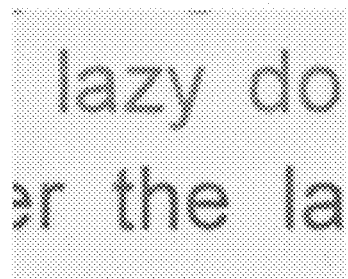
FIG. 6A is a diagram showing an example of a reference image.
Figure 6B:
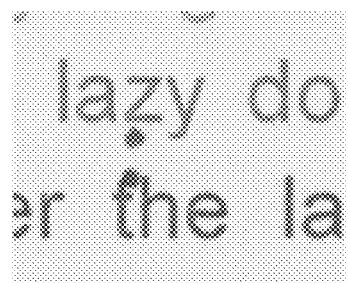
FIG. 6B is a diagram showing an example of a scanned image to be inspected.

FIG. 6A shows an example of a reference image, and FIG. 6B shows an example of a scanned image to be inspected.

As shown in FIGS. 6A and 6B, in the scanned image, there is a toner scattering defect which is not in the reference image.

Figure 6C:
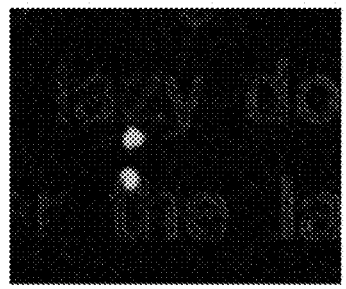
FIG. 6C is a diagram showing a differential image when registration is performed.
Figure 6D:
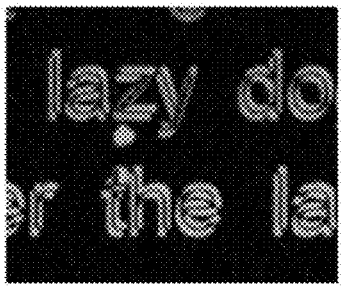
FIG. 6D is a diagram showing a differential image when registration is not performed.

FIGS. 6C and 6D show differential images between the reference image and the scanned image when registration is performed and when registration is not performed respectively.

By performing registration, as shown in FIG. 6C, since the difference between the character images (job images) in the reference image and the scanned image is reduced, it is possible to accurately detect only the image area of the toner scattering having the large difference as a defect. On the other hand, if registration is not performed, the difference between the character images is increased as shown in FIG. 6D because of the influence of misregistration at the time of scanning or the like. Thus, the image area of a normal character is also erroneously detected as a defect.

As described above, the image inspection system G according to the present embodiment includes the image former 20 that forms an image of multiple colors on a sheet, the image scanner 31 that scans the sheet surface and generates a scanned image of multiple colors, and the inspector 32 that compares the scanned image with a reference image and detects a defect in the scanned image. The image former 20 forms a job image and a marker image with a color having the lowest visibility among the multiple colors. The image scanner 31 scans the surface of the sheet on which the job image and the marker image are formed and generates a scanned image of multiple colors. The inspector 32 extracts a feature point of the job image and a feature point of the marker image from a scanned image of the color corresponding to at least the complementary color of the color having the lowest visibility among the scanned images of the multiple colors, and determines the position of the scanned image corresponding to the reference image based on the extracted feature points, and feature points of the job image and of the marker image in the reference image.

Since the marker image is formed of the color having the lowest visibility, it is possible to determine the position of the scanned image without deteriorating the job image. When the feature point of the marker image is only extracted, the feature point of the job image can be erroneously extracted, whereby an error can occur in the position of the scanned image to be determined. However, in the present embodiment, since the feature point of the job image as well as the feature point of the marker image are used for determining the position of the scanned image, it is possible to avoid such an error and to improve the accuracy of position determination by increasing the number of feature points. It is possible to determine the position of the scanned image not only by a single color having the lowest visibility of the marker image but also by the feature point of the job image of the multiple colors, and to accurately determine the position of the scanned image when the misregistration of the image in each color is caused by the color resist, whereby it is possible to enhance the stability of position determination.

[Modification]

In the above embodiment, the position of a scanned image corresponding to a reference image is determined. However, it is also possible to determine the positions of the reference image and the scanned image with respect to a reference position such as the edge of a sheet from the image forming position of a marker image.

FIG. 7 shows a processing procedure when the image inspection system G inspects an image using marker position information.

As shown in FIG. 7, in the image inspection system G, a feature point is extracted from a reference image similarly to the processing in step S1 (step S21).

The inspector 32 acquires, when the feature point is extracted, the position information on a marker image with respect to a reference position at the time of forming a job image and the marker image (step S22). The inspector 32 can acquire the coordinate position of the marker image in an original image as the position information on the marker image by, for example, setting the starting point of the original image as the reference position. In the case of the marker image m1 shown in FIG. 5A, the inspector 32 can acquire, setting the edge of the sheet as the reference position, the distances dx and dy from the reference position as the position information on the marker image m1. Such position information may be notified from the image generator 16, the controller 11, or the like to the inspector 32 after the original image is generated.

The inspector 32 determines the position of the reference image with respect to the reference position based on the feature points of the job image and the marker image extracted from the reference image and the position information on the marker image (step S23). More specifically, the inspector 32 determines the position of the feature point of the marker image with respect to the reference position based on the position information on the marker image, and then determines the position of the feature point of the job image with respect to the reference position based on the positional relationship with the feature point of the marker image.

With the same processing procedure, the inspector 32 determines the position of the scanned image to be inspected with respect to the reference position.

In other words, the inspector 32 extracts a feature point from the scanned image to be inspected similarly to the processing in step S2 (step S24). The inspector 32 acquires, when the feature point is extracted, the position information on the marker image with respect to the reference position at the time of forming the job image and the marker image (step S25). The inspector 32 determines the position of the scanned image with respect to the reference position based on the feature points of the job image and the marker image extracted from the scanned image to be inspected and the acquired position information on the marker image (step S26).

The inspector 32 registers the reference image and the scanned image so that the positions of the reference image and the scanned image with respect to the reference position match (step S27). The inspector 32 compares the registered reference image with the registered scanned image and detects a defect in the scanned image (step S28). The processing for registration and defect detection are the same as the processing described above, and detailed description is omitted.

As described above, the image inspection system G according to the modification includes the image former 20 that forms an image of multiple colors on a sheet, the image scanner 31 that scans the sheet surface and generates a scanned image of multiple colors, and the inspector 32 that detects a defect in the scanned image. The image former 20 forms a job image, and a marker image with a color having the lowest visibility among the multiple colors. The image scanner 31 scans the surface of the sheet on which the job image and the marker image are formed and generates a scanned image of multiple colors. The inspector 32 acquires the position information on the marker image with respect to a reference position, extracts feature points of the job image and the marker image from the scanned image of the color corresponding to at least the complementary color of the color having the lowest visibility among the scanned image of the multiple colors, and determines the position of the scanned image with respect to the reference position based on the extracted feature points and the position information on the marker image.

Thus, similarly to the above embodiment, it is possible to accurately stably determine the position of a scanned image to be inspected without deteriorating a job image.

The above embodiment is a preferred example of the present invention, and the present invention is not limited thereto. The above embodiment can be appropriately changed without departing from the gist of the present invention.

For example, the image inspection apparatus 30 includes the image scanner 31, but a scanned image scanned by an external image scanner may be acquired and a defect in the scanned image may be detected by the inspector 32. The sheet surface on which the job image and the marker image are formed may be scanned by the image scanner 17 instead of the image scanner 31.

In addition, the four colors of C, M, Y, and K are used as the colors of the image formed by the image former 20, and the three colors of R, G, and B are used as the colors of the scanned image generated by the image scanner 31, but the colors are not limited thereto.

In addition, the controller 11 can perform the above processing procedure of the inspector 32 by reading programs. Furthermore, a computer such as a general-purpose PC equipped with a processor as well as the image inspection system G can perform the processing procedure by reading the programs.

As a computer-readable medium storing the programs, a non-volatile memory, such as a ROM or a flash memory, or a portable recording medium, such as a CD-ROM, is applicable. As a medium for providing the data of the programs through a communication line, carrier waves are also applicable.

Although embodiments of the present invention have been described and illustrated in detail, the disclosed embodiments are made for purposes of illustration and example only and not limitation. The scope of the present invention should be interpreted by terms of the appended claims

What is claimed is:

1. An image inspection apparatus comprising:
an image forming apparatus capable of forming an image of a plurality of colors, wherein
the image forming apparatus comprises:
an inspector that compares a scanned image of a plurality of colors obtained by scanning a surface of a sheet on which a job image and a marker image are formed with a reference image, and detects a defect in the scanned image,
a color of the marker image on the sheet is a color having the lowest visibility among the plurality of colors,
the inspector extracts feature points of the job image and of the marker image from a scanned image of a single color corresponding to at least a complementary color of the color having the lowest visibility among the plurality of colors included in the scanned image, and determines a position of the scanned image corresponding to the reference image based on the extracted feature points and feature points of the job image and of the marker image in the reference image, and
the inspector converts the scanned image of the plurality of colors into the scanned image of the single color by a technique selected from the group consisting of:
replacing pixel values of the plurality of colors included in each pixel of the scanned image with a minimum pixel value of one color among the pixel values of the plurality of colors; and
weighting and averaging the pixel values of the plurality of colors included in each pixel of the scanned image such that a weighting coefficient of the color corresponding to the complementary color of the color having the lowest visibility is to be the maximum,
and extracts the feature points from the scanned image of the single color.

2. The image inspection apparatus according to claim 1, wherein
the color having the lowest visibility is yellow, and
the complementary color of the color having the lowest visibility is blue.

3. An image inspection system comprising:
an image inspection apparatus according to claim 1;
an image former that forms an image of a plurality of colors on a sheet; and an image scanner that scans a surface of the sheet and generates a scanned image of a plurality of colors, wherein the image former forms a job image, and a marker image with a color having the lowest visibility among the plurality of colors, and the image scanner scans the surface of the sheet on which the job image and the marker image are formed, and generates the scanned image of the plurality of colors.

4. An image inspection apparatus comprising:

an image forming apparatus capable of forming an image of a plurality of colors, wherein the image forming apparatus comprises:

an inspector that detects a defect in a scanned image of a plurality of colors obtained by scanning a surface of a sheet on which a job image and a marker image are formed, a color of the marker image on the sheet is a color having the lowest visibility among the plurality of colors, the inspector acquires position information on the marker image with respect to a reference position, extracts feature points of the job image and of the marker image from a scanned image of a single color corresponding to at least-a complementary color of the color having the lowest visibility among the plurality of colors included in the scanned image, and determines a position of the scanned image with reference to the reference position based on the extracted feature points and the position information on the marker image, and the inspector converts the scanned image of the plurality of colors into the scanned image of the single color by a technique selected from the group consisting of:

replacing pixel values of the plurality of colors included in each pixel of the scanned image with a minimum pixel value of one color among the pixel values of the plurality of colors; and weighting and averaging the pixel values of the plurality of colors included in each pixel of the scanned image such that a weighting coefficient of the color corresponding to the complementary color of the color having the lowest visibility is to be the maximum, and extracts the feature points from the scanned image of the single color.

5. The image inspection apparatus according to claim 4, wherein the color having the lowest visibility is yellow, and the complementary color of the color having the lowest visibility is blue.

6. An image inspection system comprising:

an image inspection apparatus according to claim 4;

an image former that forms an image of a plurality of colors on a sheet; and an image scanner that scans a surface of the sheet and generates a scanned image of a plurality of colors, wherein the image former forms a job image, and a marker image with a color having the lowest visibility among the plurality of colors, and the image scanner scans the surface of the sheet on which the job image and the marker image are formed, and generates the scanned image of the plurality of colors.

7. A non-transitory recording medium storing a computer readable program used for a computer that determines an image position, the program causing the computer to execute:

in an image forming apparatus capable of forming an image of a plurality of colors, comparing a scanned image of a plurality of colors obtained by scanning a surface of a sheet on which a job image and a marker image, a color of the marker image on the sheet being a color having the lowest visibility among the plurality of colors, are formed with a reference image, and detecting a defect in the scanned image;

extracting feature points of the job image and of the marker image from a scanned image of a color corresponding to at least-a complementary color of the color having the lowest visibility among the plurality of colors included in the scanned image;

determining a position of the scanned image corresponding to the reference image based on the extracted feature points and feature points of the job image and of the marker image in the reference image, and wherein, in extracting the feature points, the scanned image of the plurality of colors is converted into the scanned image of the single color by a technique selected from the group consisting of:

replacing pixel values of the plurality of colors included in each pixel of the scanned image with a minimum pixel value of one color among the pixel values of the plurality of colors; and weighting and averaging the pixel values of the plurality of colors included in each pixel of the scanned image such that a weighting coefficient of the color corresponding to the complementary color of the color having the lowest visibility is to be the maximum, and the feature points are extracted from the scanned image of the single color.

8. The non-transitory recording medium storing a computer readable program according to claim 7, wherein the color having the lowest visibility is yellow, and the complementary color of the color having the lowest visibility is blue.

9. A non-transitory recording medium storing a computer readable program used for a computer that determines an image position, the program causing the computer to execute:

in an image forming apparatus capable of forming an image of a plurality of colors, detecting a defect in a scanned image of a plurality of colors obtained by scanning a surface of a sheet on which a job image and a marker image, a color of the marker image on the sheet being a color having the lowest visibility among the plurality of colors, are formed;

acquiring position information on the marker image with respect to a reference position;

extracting feature points of the job image and of the marker image from a scanned image of a color corresponding to at least-a complementary color of the color having the lowest visibility among the plurality of colors included in the scanned image;

determining a position of the scanned image with reference to the reference position based on the extracted feature points and the position information on the marker image, and wherein, in extracting the feature points, the scanned image of the plurality of colors is converted into the scanned image of the single color by a technique selected from the group consisting of:

replacing pixel values of the plurality of colors included in each pixel of the scanned image with a minimum pixel value of one color among the pixel values of the plurality of colors; and weighting and averaging the pixel values of the plurality of colors included in each pixel of the scanned image such that a weighting coefficient of the color corresponding to the complementary color of the color having the lowest visibility is to be the maximum, and the feature points are extracted from the scanned image of the single color.

10. The non-transitory recording medium storing a computer readable program according to claim 9, wherein the color having the lowest visibility is yellow, and the complementary color of the color having the lowest visibility is blue.

* * * * *